Patented Sept. 24, 1940

2,215,583

UNITED STATES PATENT OFFICE 2,215,583

DIALKOXY SUBSTITUTED GLYCOLS AND PROCESS FOR PREPARING SAME

Joseph Heckmaier and Felix Kaufler, Munich, Germany, assignors to Alexander Wacker Gesellschaft für Elektrochemische Industrie, G. m. b. H., Munich, Bavaria, Germany, a corporation of Germany No Drawing. Application April 28, 1937, Serial No. 139,498. In Germany May 9, 1936

12 Claims. (Cl. 260—615)

This invention relates to dialkoxy substituted β-glycols, and to a process for preparing same.

We have discovered that dialkoxy substituted β-glycols may be obtained by condensing alkoxy aldehydes, and hydrogenating the condensation products. The alkoxy aldehydes are condensed in the presence of an alkaline condensation agent to dialkoxy substituted-hydroxy aldehyde compounds. Metal alcoholates, and especially alcoholates of alcohols corresponding to the alkyl group of the aldehydes, are suitable condensation agents. The condensation is carried out at temperatures sufficiently low that water is not split off, and is preferably carried out in the absence of water and below room temperatures. The condensation product is hydrogenated in the well-known manner, for example, in the presence of a highly active hydrogenation catalyst, such as a nickel screen.

The reaction proceeds according to the following equations:

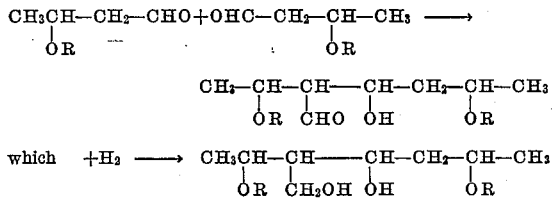

The following examples illustrate methods of carrying out our invention, but it is understood that these examples are given for purposes of illustration and not by way of limitation.

Example 1

7 c. c. of a 10% solution of sodium methylate in methyl alcohol is added drop by drop, with cooling and energetic stirring, to 306 grams of 3-methoxy-butyraldehyde at —5° C. The condensation of the aldehyde is completed in about two hours, after which acetic acid is added and the mass is diluted with methyl alcohol. Hydrogenation is then effected at room temperature in the presence of a nickel screen catalyst. At least 80% of the condensation product is converted into 2,6-dimethoxy-3-hydroxy-methyl-4-hydroxy-heptane, having a boiling point of 105 to 109° C. at 0.05 mm. pressure.

Example 2

3-ethoxy-butyraldehyde is condensed as in Example 1, in the presence of sodium ethylate, and the condensation product is hydrogenated to 2,6-diethoxy-3-hydroxy-methyl-4-hydroxy-heptane.

In a similar manner, other alkoxy aldehydes or mixtures thereof may be converted into the corresponding glycols or mixed glycols.

The substituted glycols obtained according to this invention are liquids having a high boiling point, and are soluble in water and in most solvents. They may be used as starting compounds for chemical syntheses, and are useful as such or in the form of their derivatives, such as esters, ethers, etc. as solvents, for example, in lacqeurs, dyes, cleaning fluids, perfumes, etc.

Modifications may be carried out in the practice of our invention without departing from the scope and spirit thereof, and we are not to be limited except by the appended claims.

The invention claimed is:

1. The process for producing dialkoxy substituted glycols of the octane series having two free hydroxyl groups comprising condensing two molecules of the same alkoxy butyraldehyde in the presence of an alkaline condensing agent and at a temperature sufficiently low that water is not split off and hydrogenating the condensation product.

2. The process for producing dialkoxy substituted glycols of the octane series having two free hydroxyl groups comprising condensing two molecules of the same alkoxy butyraldehyde in the presence of an alkaline condensing agent and at a temperature below room temperature sufficiently low that water is not split off and hydrogenating the condensation product.

3. The process for producing dialkoxy substituted glycols of the octane series having two free hydroxyl groups comprising condensing two molecules of the same alkoxy butyraldehyde in the presence of an alkaline condensing agent and at a temperature sufficiently low that water is not split off and hydrogenating the condensation product in the presence of a nickel catalyst.

4. The process for producing dialkoxy substituted glycols of the octane series having two free hydroxyl groups comprising condensing two molecules of the same alkoxy butyraldehyde in the presence of a metal alcoholate and at a temperature sufficiently low that water is not split off and hydrogenating the condensation product.

5. The process for producing dialkoxy substituted glycols or the octane series having two free hydroxyl groups comprising condensing two molecules of the same alkoxy butyraldehyde in the presence of a metal alcoholate of an alcohol corresponding to the alkoxy group of the aldehyde and at a temperature sufficiently low that water is not split off and hydrogenating the condensation product.

6. The process for producing 2,6-dimethoxy-3-hydroxy-methyl-4-hydroxy-heptane comprising condensing two molecules of 3-methoxy butyraldehyde in the presence of an alkaline condensing agent and at a temperature sufficiently low that water is not split off, and hydrogenating the condensation product.

7. The process for producing 2,6-dimethoxy-3-hydroxy-methyl-4-hydroxy-heptane comprising condensing two molecules of 3-methoxy butyraldehyde at a temperature sufficiently low that water is not split off in the presence of sodium methylate and in the absence of water, and hydrogenating the condensation product in the presence of a nickel catalyst.

8. The process for producing 2,6-diethoxy-3-hydroxy-methyl-4-hydroxy-heptane comprising condensing two molecules of 3-ethoxy butyraldehyde in the presence of an alkaline condensing agent and at a temperature sufficiently low that water is not split off, and hydrogenating the condensation product.

9. The process for producing 2,6-diethoxy-3-hydroxy-methyl-4-hydroxy-heptane comprising condensing two molecules of 3-ethoxy butyraldehyde at a temperature sufficiently low that water is not split off in the presence of sodium ethylate and in the absence of water, and hydrogenating the condensation product in the presence of a nickel catalyst.

10. A 3-carbinol-substituted, 4-hydroxy-substituted, dialkoxy-substituted heptane.

11. 2,6 - dimethoxy - 3-hydroxy-methyl-4-hydroxy-heptane.

12. 2,6 - diethoxy - 3 - hydroxy - methyl-4-hydroxy-heptane.

JOSEPH HECKMAIER.
FELIX KAUFLER.